US012693429B2

(12) United States Patent
Gusi et al.

(10) Patent No.: US 12,693,429 B2
(45) Date of Patent: Jul. 28, 2026

(54) GLOBAL NAVIGATION SATELLITE SYSTEM (GNSS) POSITIONING WITH COMPRESSED OBSERVABLES

(71) Applicant: Albora Technologies Limited, London (GB)

(72) Inventors: Adrià Gusi, Barcelona (ES); Pablo Perdiguero, Barcelona (ES); Pau Closas, Westborough, MA (US)

(73) Assignee: ALBORA TECHNOLOGIES LIMITED, London (GB)

( * ) Notice: Subject to any disclaimer, the term of this patent is extended or adjusted under 35 U.S.C. 154(b) by 328 days.

(21) Appl. No.: 18/202,937

(22) Filed: May 28, 2023

(65) Prior Publication Data

US 2024/0393476 A1      Nov. 28, 2024

(51) Int. Cl.
*G01S 19/37* (2010.01)
*G01S 19/39* (2010.01)

(52) U.S. Cl.
CPC ............ *G01S 19/37* (2013.01); *G01S 19/396* (2019.08)

(58) Field of Classification Search
CPC ............................... G01S 19/37; G01S 19/396
See application file for complete search history.

(56) References Cited

U.S. PATENT DOCUMENTS 12,019,163 B2 * 6/2024 Mobarak ............... G01S 19/215
2012/0154210 A1 * 6/2012 Landau ................... G01S 19/43
                                                              342/357.23

2015/0309177 A1 * 10/2015 Wallace ................. G01S 19/43
                                                              342/357.42
2016/0116602 A1 * 4/2016 McFarland ............. G01S 19/45
                                                              342/357.28
2024/0085567 A1 * 3/2024 Cole ..................... G01S 19/071

FOREIGN PATENT DOCUMENTS

EP           3355079 B1 * 3/2023 ............. G01S 19/40
EP           3430351 B1 * 4/2025 ............. G01S 19/32
WO    WO-2012151006 A1 * 11/2012 ............. G01S 19/43

* cited by examiner

*Primary Examiner* — William Kelleher
*Assistant Examiner* — Kenneth W Good
(74) *Attorney, Agent, or Firm* — CRGO Global; Steven M. Greenberg

(57)                    ABSTRACT

Global navigation satellite system (GNSS) positioning with compressed observables includes establishing different communicative couplings over a data communications network between a position, velocity, time (PVT) service and each of different roving receivers, with each of the different roving receivers receiving different GNSS signals from satellites in an orbiting GNSS constellation. Thereafter, the PVT service receives from each roving receiver from over the data communications network, parametric constraints for model fitting of a parametric, predictive model of GNSS observables for the roving receiver. The PVT service then predicts, for each different roving receiver from which the parametric constraints are received, a set of the GNSS observables reconstructed from the parametric, predictive model using the parametric constraints. Finally, the PVT service computes a position for each one of the roving receivers based upon a corresponding one of the set of the GNSS observables.

12 Claims, 3 Drawing Sheets

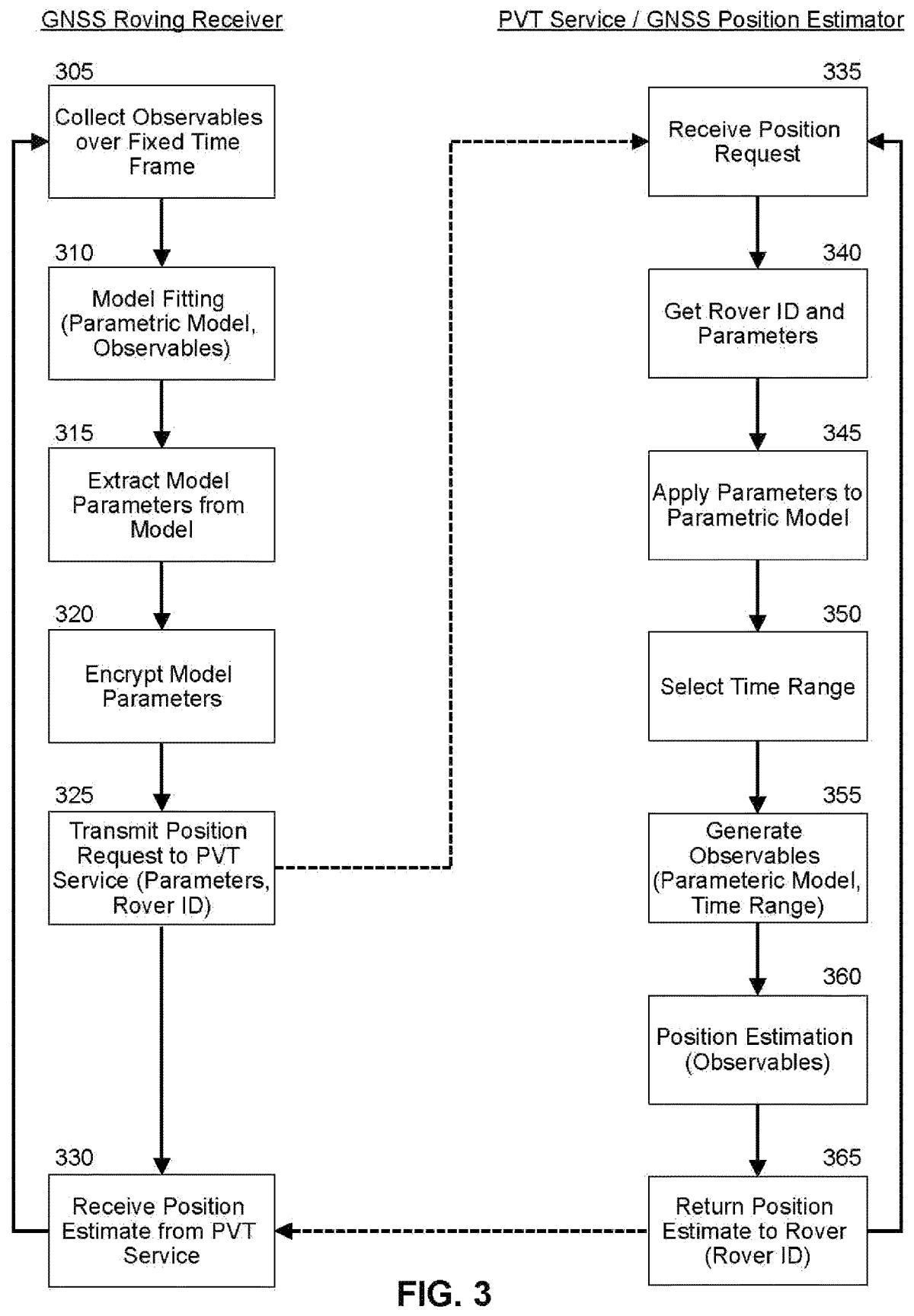

GNSS Roving Receiver          PVT Service / GNSS Position Estimator

305
Collect Observables over Fixed Time Frame

310
Model Fitting (Parametric Model, Observables)

315
Extract Model Parameters from Model

320
Encrypt Model Parameters

325
Transmit Position Request to PVT Service (Parameters, Rover ID)

330
Receive Position Estimate from PVT Service

335
Receive Position Request

340
Get Rover ID and Parameters

345
Apply Parameters to Parametric Model

350
Select Time Range

355
Generate Observables (Parameteric Model, Time Range)

360
Position Estimation (Observables)

365
Return Position Estimate to Rover (Rover ID)

FIG. 3

GLOBAL NAVIGATION SATELLITE SYSTEM (GNSS) POSITIONING WITH COMPRESSED OBSERVABLES

BACKGROUND OF THE INVENTION

Field of the Invention

The present invention relates to the field of global navigation satellite system (GNSS) position determination in satellite-based global positioning systems.

Description of the Related Art

Satellite-based positioning refers to the position, velocity and time (PVT) determination for a GNSS receiver according to GNSS positioning data within signals such as those produced by the global positioning system (GPS), Global Navigation Satellite System (GLONASS), Galileo, NavIC and BeiDou. The core signal for GNSS is a direct-sequence spread-spectrum signal, synchronously transmitted by each satellite in a GNSS satellite constellation. The spread-spectrum signal includes both a ranging code, also referred to as the pseudorandom noise (PRN) spreading sequence, and also a low-rate data-link which broadcasts ephemeris information for the corresponding satellite.

Each GNSS receiver receives the GNSS signal from which PVT can be estimated. To do so, programmatic logic executing in coordination with the GNSS receiver estimates the ranging code in the signal model so as to construct a set of observables for each satellite from which the GNSS signal had been received. The observables in the set includes a series of ranges computed from the time delay of the receipt of the corresponding GNSS signal, referred to as pseudoranges, and also phase-difference estimates, referred to as carrier-phase measurements, between the different GNSS signals. The computation of PVT with the set of observables can be processor intensive, though, and taxing on the low power constraints of the GNSS receiver. As such, the GNSS receiver transmits the observables to remotely positioned PVT service adapted to compute PVT using the observables on behalf of the GNSS receiver. For the PVT service, then, the computation of PVT is a matter of solving for a multi-lateration of the observables within a least squares algorithm.

Of note, while the computation of PVT for a GNSS receiver with the set of observables can be processor intensive and thus taxing on the low power constraints of the GNSS receiver, even with the offloading of the PVT computation to the PVT service, the problem of power consumption remains in the transmission of the observables from the GNSS receiver to the remotely positioned PVT service so as to permit the PVT service to perform the PVT computation. In particular, for the GNSS receiver to collect observables over a significant range of time and then to transmit those collected observables to the PVT service, the draw on the power resources of the GNSS receiver can be significant.

BRIEF SUMMARY OF THE INVENTION

Embodiments of the present invention address technical deficiencies of the art in respect to low power constrained GNSS positioning. To that end, embodiments of the present invention provide for a novel and non-obvious method for GNSS positioning with compressed observables. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for GNSS positioning with compressed observables includes establishing different communicative couplings over a data communications network between a PVT service and each of different roving receivers, with each of the different roving receivers receiving different GNSS signals from satellites in an orbiting GNSS constellation. The method additionally includes receiving in the PVT service from each one of the different roving receivers from over the data communications network, parametric constraints for model fitting of a predictive model of GNSS observables for the one of the different roving receivers. The method yet further includes predicting in the PVT service, for each one of the different roving receivers from which the parametric constraints are received, a set of the GNSS observables reconstructed from the model using the parametric constraints. Finally, the method includes computing by the PVT service a position for each one of the roving receivers based upon a corresponding one of the set of the GNSS observables.

In one aspect of the embodiment, the set of the GNSS observables includes a number of observables determined according to a pre-determined requirement of positioning accuracy. Optionally, additional observables that have been received from one or more of the orbiting satellites directly in a fixed receiver communicatively coupled to the PVT service may be added to the GNSS observables. In another aspect of the embodiment, the predictive model and the corresponding model parameters are encrypted prior to transmission over the data communications network and are decrypted subsequent to receipt in the PVT service. In yet another aspect of the embodiment, the set of transmitted model parameters is compressed further by encoding the corresponding binary message with a given bit resolution.

In another embodiment of the invention, a data processing system is adapted for GNSS positioning with compressed observables. The system includes a host computing platform of one or more computers, each with memory and one or processing units including one or more processing cores. A PVT service executes in the host computing platform, transmitting positioning information to communicatively coupled roving receivers in response to having received positioning requests from the coupled roving receivers, each of which having received different GNSS signals from satellites in an orbiting GNSS constellation. Notably, a GNSS positioning module is coupled to the PVT service.

The GNSS positioning module includes computer program instructions enabled while executing in the memory of at least one of the processing units of the host computing platform to receive from each one of the different roving receivers parametric constraints for model fitting of a predictive model of GNSS observables for the one of the different roving receivers. The program instructions further are enabled to predict, for each one of the different roving receivers from which the parametric constraints are received, a set of the GNSS observables reconstructed from the model using the parametric constraints. The program instructions yet further are enabled to compute a position for each one of the roving receivers based upon a corresponding one of the set of the GNSS observables. Finally, the program instructions are enabled to provide to the PVT service the computed position for each one of the roving receivers for transmission by the PVT service to each corresponding one of the roving receivers.

In yet another embodiment of the invention, a computing device includes a non-transitory computer readable storage medium having program instructions stored therein. The instructions are executable by at least one processing core of a processing unit. During execution, the program instructions cause the processing unit to perform GNSS positioning with compressed observables.

Specifically, the program instructions during execution collect into memory of a roving receiver of different GNSS signals, a time sequence of GNSS observables received from one or more satellites of an orbiting GNSS constellation. The program instructions additionally model fit the time sequence set of observables into a parametric predictive model. The program instructions yet further compute a set of model parameters for the parametric predictive model. Finally, the program instructions transmit the model and the set of model parameters from the roving receiver over a data communications network to a PVT service, that generates a set of predicted observables from the parametric, predictive model according to the model parameters and generates a position estimate for the rover with the predicted observables.

In this way, the low power constraints of a roving receiver can be met through the avoidance of transmitting sets of observables from roving receiver to PVT service by instead transmitting a limited set of parameters for a parametric, predictive model fit according to the observables received in the roving receiver. The reduction in power draw in turn can accommodate the possibility of encrypting the parameters as an enhanced layer of security.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for GNSS positioning with compressed observables. In accordance with an embodiment of the invention, different roving receivers receive different sets of observables over a limited range of time from different positioning satellites in a positioning satellite constellation. Each roving receiver fits correspondingly received ones of the sets of the observables to a predetermined parametric, predictive model and, extracts from that model, the resulting model parameters. Thereafter, each roving receiver encodes the extracted parameters and transmits to a remotely positioned PVT service only the encoded parameters and not the correspondingly received ones of the sets of the observables.

The remotely positioned PVT service, in turn, upon receiving an encoded set of parameters for an associated one of the roving receivers, decodes the parameters and applies the decoded parameters to parametric, predictive model for the associated one of the roving receivers. The PVT service then generates a set of observables over a specified time range for the associated one of the roving receivers according to the tuned parametric, predictive model. Finally, the PVT service computes a position estimation for the associated one of the roving receivers based upon the generated set of observables. The PVT service then returns the computed position estimation to the associated one of the roving receivers. In this way, position estimation for a roving receiver can be performed while minimizing power draw at the roving receiver since there is no need to transmit the observables from rover to PVT service.

Figure 1:
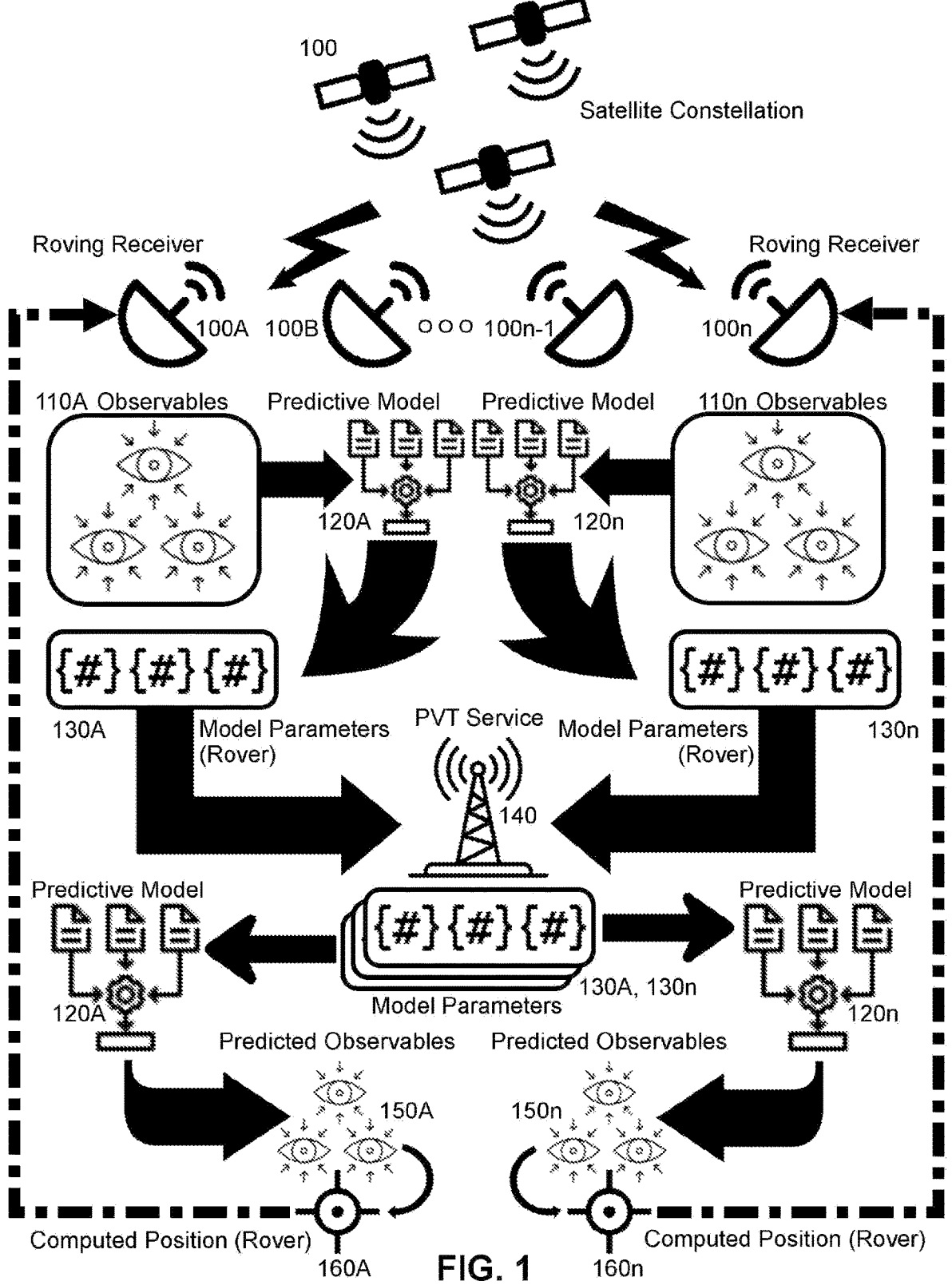
FIG. 1 is a pictorial illustration reflecting different aspects of a process of GNSS positioning with compressed observables.

In illustration of one aspect of the embodiment, FIG. 1 pictorially shows a process of GNSS positioning with compressed observables. As shown in FIG. 1, different GNSS roving receivers 100A, 100B, 100n-1,100n (only four receivers shown for the purpose of illustrative simplicity) receive satellite positioning data from different satellites 100 in a GNSS satellite constellation. Each GNSS roving receiver 100A, 100B, 100n-1,100n extracts from the satellite positioning data, a corresponding set of observables 110A, 110n, for instance pseudo-range or carrier-phase data. Each GNSS roving receiver 100A, 100B, 100n-1,100n, in turn model fits the corresponding set of observables 110A, 110n into an associated parametric, predictive model 120A, 120n, for instance considering a linear regression model with linear, quadratic or cubic kernels, or other parametric non-linear regression strategy of choice.

In this regard, the associated parametric, predictive model 120A, 120n can take the form of the regression model:

$$P_t = h(t; \theta)$$

where $P_t$ is the corresponding one of the observables 110A, 110n at time instant t, and $h(t; \theta)$ is a regression model with d-dimensional model parameters 130A, 130n

$$\theta \in \mathbb{R}^d$$

so that the function $h(t; \theta)$ fits to the observed data $\{P_1, \ldots P_T\}$ (the set of observables 110A, 110n) observed at the different time instances t={1, . . . ,T} according to the fitting parameters $\theta$ (model parameters 130A, 130n). In the particular case of linear regression, the predictive model at a particular time instant t is:

$$h(t; \theta) = \theta^T \cdot \phi(t)$$

-continued $$\phi(t) = \begin{bmatrix} 1 \\ t \\ t^2 \\ \vdots \\ t^d \end{bmatrix}$$

where $\phi(t)$ is the kernel function, whose nonlinearity can be adjusted by d. If d=1 the kernel is linear, if d=2 it is quadratic, if d=3 cubic, and so on.

As it will be understood, in linear regression the model parameters can be learnt from the data as $$\theta = \left( \sum_{t=1}^{T} \phi(t) \cdot \phi^T(t) + \lambda I \right)^{-1} \sum_{t=1}^{T} p_t \cdot \phi(t)$$

where $\lambda$ is a regularization parameter and a dataset of T observables $\{P_t, \ldots P_T\}$ is assumed to be available. The model learning equation would change if other regression methods are considered. Each GNSS roving receiver 100A, 100B, 100n-1,100n then extracts the model parameters 130A, 130n for the associated parametric, predictive model 120A, 120n, for encoding and wireless transmission to a remotely positioned PVT service 140. Optionally, the model parameters 130A, 130n can be compressed through encoding optimization prior to transmission. As a further option, the model parameters 130A, 130n can be encrypted for the purpose of data privacy and security.

For each one of the GNSS roving receivers 100A, 100B, 100n-1,100n, upon receipt of corresponding model parameters 130A, 130n, the PVT service 140 decodes the encoded model parameters 130A, 130n and applies the decoded model parameters 130A, 130n to the associated parametric, predictive model 120A, 120n. With the tuned form of the associated parametric, predictive model 120A, 120n, the PVT service 140 generates a predicted set of observables 150A, 150n based upon a time range provided to the associated parametric, predictive model 120A, 120n.

Thereafter, the PVT service 140 utilizes the predicted set of observables 150A, 150n for each of the GNSS roving receivers 100A, 100B, 100n-1,100n in order to engage in advance positioning computations—namely error reduction accounting for computational errors resulting from ionospheric or tropospheric delays, satellite clock biases, and the like. Subsequently, using the predicted set of observables 150A 150n and the error computation, the PVT service 140 computes an estimated position 160A, 160n for each one of the GNSS roving receivers 100A, 100B, 100n-1,100n. Finally, the PVT service 140 returns the estimated position 160A, 160n to the one of the GNSS roving receivers 100A, 100B, 100n-1,100n.

Figure 2:
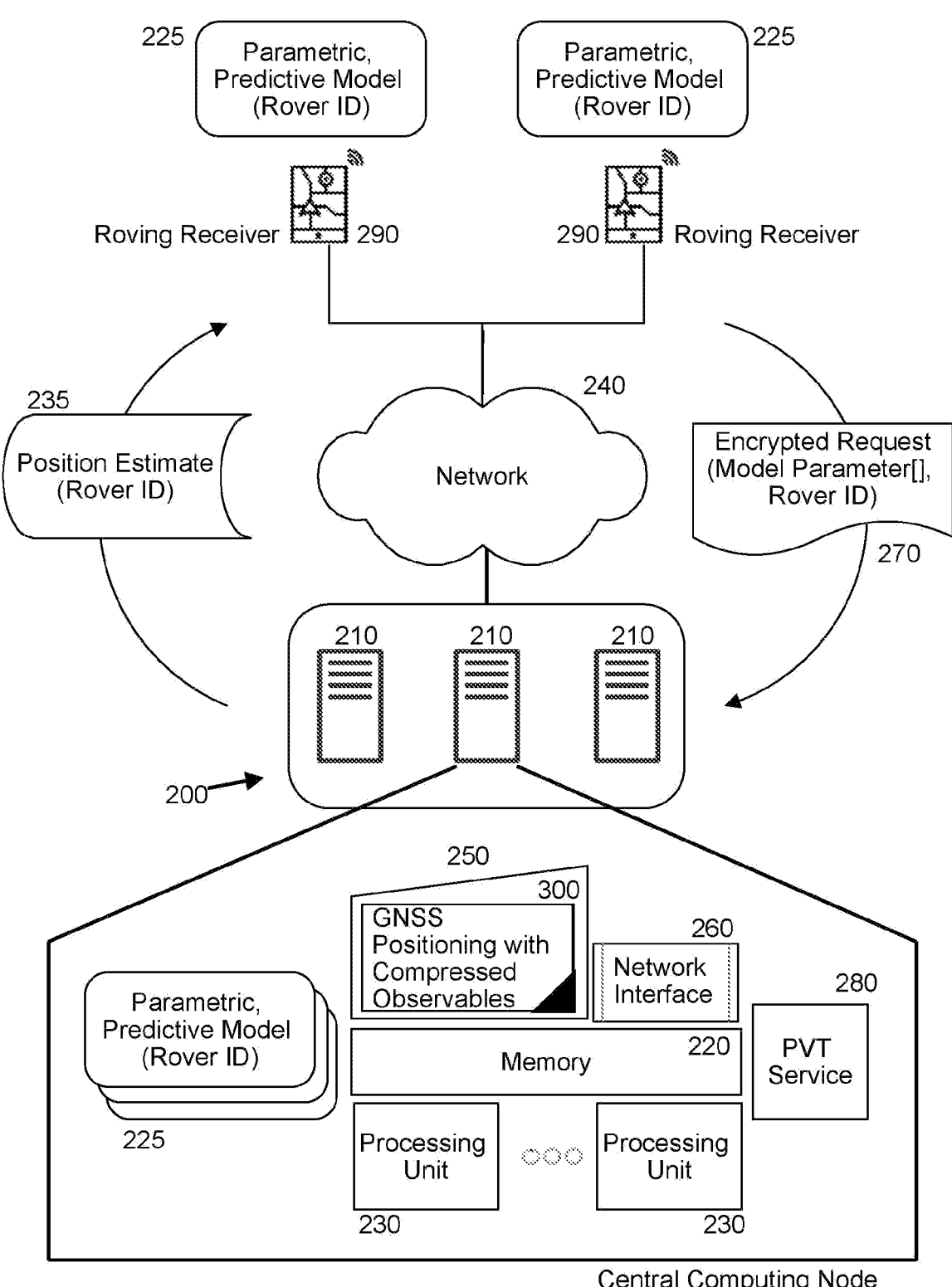
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform GNSS positioning with compressed observables. In the data processing system illustrated in FIG. 1, a host computing platform 200 is provided. The host computing platform 200 includes one or more computers 210, each with memory 220 and one or more processing units 230. The computers 210 of the host computing platform can be co-located within one another over a local area network, or over a data communications bus, or the computers can be remotely disposed from one another and in communication with one another through network interface 260 over a data communications network 240.

To that end, different GNSS roving receivers 290 communicate over the data communications network 240 with a PVT service 280 hosted within the host computing platform 200 so as to acquire position estimates 235 provided by the PVT service 280 in response to transmitted position requests 270. To that end, the host computing platform includes a computing device 250 having a non-transitory computer readable storage medium. The computing device 250 can be accessed by the processing units 230 of one or more of the computers 210. The computing device 250 stores thereon or retains therein a program module 300 that includes computer program instructions which when executed by one or more of the processing units 230, performs a programmatically executable process for GNSS positioning with compressed observables.

Specifically, the program instructions during execution receive from the PVT service 280 a request 270 from a corresponding one of the different roving receivers 290, the request encapsulating an identity a selection of model parameters for a parametric, predictive model 225 and an identity of the one of the different roving receivers 290. The request 270 can be encrypted for the purpose of data privacy and security and the model parameters therein may be encoded for compression according to a specific bit resolution. Upon receipt of the request 270, the program instructions decrypt the request 270 as required, and decode the model parameters so that the program instructions then apply the model parameters to a parametric, predictive model 225 selected for the one of the different roving receivers 290.

Thereafter, the program instructions select a number of observables to be generated from the parametric model 225. In particular, the number of observables to be generated can correspond to a predetermined selection of accuracy, the more observables selected resulting in a higher degree of accuracy of a computed position estimate. As such, the program instructions then generate the selected number of observables as a function of the parametric, predictive model. Subsequently, the program instructions provide the generated observables to the PVT service 280 from which the PVT service 280 computes a position estimate 250. Finally, the PVT service 280 returns the position estimate to the one of the different roving receivers 290.

In further illustration of an exemplary operation of the module, FIG. 3 is a flow chart illustrating one of the aspects of the process of FIG. 1. The process as illustrated in FIG. 3 occurs separately between a GNSS roving receiver and the GNSS position estimator coupled to the PVT service. Considering first the portion of the process performed within the GNSS roving receiver, beginning in block 305, observables are collected over a fixed period of time from different satellite data feeds from different positioning satellites in a GNSS satellite constellation. In block 310, the observables are fit to a parametric, predictive model according to a linear regression technique and in block 315, different model parameters of the parametric, predictive model are extracted. In block 320, the extracted model parameters are encoded for compression according to a specific bit resolution and optionally, the encoded parameters are encapsulated in a message that is then encrypted. Finally, in block 325 the message is transmitted as part of a position request to a PVT service from over a wireless computer communications network, including an identify of the GNSS roving receiver.

Turning now to the portion of the process performed by the GNSS position estimator of the PVT service, in block

335 the position request is received and decrypted as required. In block 340, the identity of the GNSS roving receiver associated with the position request is determined and the encoded model parameters are decoded. Then, in lock 345, the decoded parameters are applied to the parametric, predictive model. In block 350, a time range is selected along with a number of desired observables consistent with a predetermined requirement for a degree of positioning accuracy. As such, in block 355 the requisite number of observables are generated by the parametric, predictive model. In block 360, a position estimation is computed according to the generated observables. Finally, in block 365, the computed position estimated is returned to the GNSS roving receiver associated with the determined identity.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for global navigation satellite system (GNSS) positioning with compressed observables, the method comprising:

establishing different communicative couplings over a data communications network between a position, velocity, time (PVT) service and each of several, different roving receivers, each of the different roving receivers receiving different GNSS signals from satellites in an orbiting GNSS constellation;

receiving in the PVT service from each one of the different roving receivers from over the data communications network, a parametric, predictive model of GNSS observables for the one of the different roving receivers and parametric constraints for model fitting of the parametric, predictive model of GNSS observables for the one of the different roving receivers;

predicting in the PVT service, for each one of the different roving receivers from which the parametric constraints are received, a set of the GNSS observables reconstructed from the parametric, predictive model using the parametric constraints; and, computing by the PVT service a position for each one of the roving receivers based upon a corresponding one of the set of the GNSS observables; and, transmitting the computed position for each one of the roving receivers to each corresponding one of the roving receivers.

2. The method of claim 1, wherein the set of the GNSS observables includes a number of observables determined at different instances of time according to a pre-determined requirement of positioning accuracy.

3. The method of claim 1, wherein the parametric, predictive model and the corresponding model parameters are encrypted prior to transmission over the data communications network and are decrypted subsequent to receipt in the PVT service.

4. The method of claim 1, further comprising adding to the GNSS observables additional observables received from one or more of the orbiting satellites directly in a fixed receiver communicatively coupled to the PVT service.

5. A data processing system adapted for global navigation satellite system (GNSS) positioning with compressed observables, the system comprising:

a host computing platform comprising one or more computers, each with memory and one or processing units including one or more processing cores;

a position, velocity, time (PVT) service executing in the host computing platform, the PVT service transmitting positioning information to communicatively coupled roving receivers responsive to receiving positioning requests from the coupled roving receivers each of the different roving receivers receiving different GNSS signals from satellites in an orbiting GNSS constellation; and, a GNSS positioning module coupled to the PVT service and comprising computer program instructions enabled while executing in the memory of at least one of the processing units of the host computing platform to perform:

receiving from each one of the different roving receivers a parametric, predictive model of GNSS observables for the one of the different roving receivers and parametric constraints for model fitting of the parametric, predictive model of GNSS observables for the one of the different roving receivers;

predicting, for each one of the different roving receivers from which the parametric constraints are received, a set of the GNSS observables reconstructed from the parametric, predictive model using the parametric constraints;

computing a position for each one of the roving receivers based upon a corresponding one of the set of the GNSS observables; and, providing to the PVT service the computed position for each one of the roving receivers for transmission by the PVT service to each corresponding one of the roving receivers.

6. The system of claim 5, wherein the set of the GNSS observables includes a number of observables determined at different instances of time according to a pre-determined requirement of positioning accuracy.

7. The system of claim 5, wherein the parametric, predictive model and the corresponding model parameters are encrypted prior to transmission over the data communications network and are decrypted subsequent to receipt in the PVT service.

8. The system of claim 5, wherein the program instructions further are enabled to perform adding to the GNSS observables additional observables received from one or more of the orbiting satellites directly in a fixed receiver communicatively coupled to the PVT service.

9. A computing device comprising a non-transitory computer readable storage medium having program instructions stored therein, the instructions being executable by at least one processing core of a processing unit to cause the processing unit to perform global navigation satellite system (GNSS) positioning with compressed observables by:

collecting into memory of a roving receiver of different GNSS signals, a time sequence of GNSS observables received from one or more satellites of an orbiting GNSS constellation;

model fitting the time sequence set of observables into a parametric predictive model;

computing a set of model parameters for the parametric predictive model;

transmitting both the parametric predictive model and the set of model parameters from the roving receiver over a data communications network to a position, velocity, and time (PVT) service, that generates a set of predicted observables from the parametric, predictive model according to the model parameters and generates a position estimate for the rover with the predicted observables.

10. The device of claim 9, wherein the set of the GNSS observables includes a number of observables determined at different instances of time according to a pre-determined requirement of positioning accuracy.

11. The device of claim 9, wherein the parametric, predictive model and the corresponding model parameters are encrypted prior to transmission over the data communications network and are decrypted subsequent to receipt in the PVT service.

12. The device of claim 9, wherein the set of transmitted model parameters is compressed further by encoding the corresponding binary message with a given bit resolution.

* * * * *